(12) United States Patent
Chellberg et al.

(10) Patent No.: US 8,931,629 B2
(45) Date of Patent: Jan. 13, 2015

(54) VERNIER ADJUSTOR FOR FEED DISPENSERS

(71) Applicant: Innova-Tech Solutions Corp., Alpena, MI (US)

(72) Inventors: Paul M. Chellberg, Presque Isle, MI (US); John A. Radtke, Alpena, MI (US)

(73) Assignee: Innova-Tech Solutions Corp., Alpena, MI (US)

( * ) Notice: Subject to any disclaimer, the term of this patent is extended or adjusted under 35 U.S.C. 154(b) by 0 days.

(21) Appl. No.: 14/087,766

(22) Filed: Nov. 22, 2013

(65) Prior Publication Data

US 2014/0076238 A1  Mar. 20, 2014

Related U.S. Application Data

(62) Division of application No. 13/435,872, filed on Mar. 30, 2012, now Pat. No. 8,640,861.

(51) Int. Cl.
*B65G 23/44* (2006.01)

(52) U.S. Cl.
USPC .......................................................... 198/813

(58) Field of Classification Search
USPC ............... 119/56.1; 198/813, 814, 815, 816
See application file for complete search history.

(56) References Cited

U.S. PATENT DOCUMENTS

| 4,078,275 | A |   | 3/1978  | Baird             |         |
|-----------|---|---|---------|-------------------|---------|
| 4,185,908 | A |   | 1/1980  | Taylor et al.     |         |
| 4,315,484 | A |   | 2/1982  | Kingery           |         |
| 4,723,647 | A | * | 2/1988  | Norton et al.     | 198/364 |
| 5,389,045 | A |   | 2/1995  | Lyons             |         |
| 6,209,715 | B1 |  | 4/2001  | Eltvedt           |         |
| 6,279,733 | B2 |  | 8/2001  | Eltvedt           |         |
| 6,526,913 | B2 |  | 3/2003  | Bondarenko et al. |         |
| 6,976,450 | B2 |  | 12/2005 | Bondarenko et al. |         |

\* cited by examiner

*Primary Examiner* — Yvonne Abbott
(74) *Attorney, Agent, or Firm* — Warner Norcross & Judd LLP

(57) ABSTRACT

A vernier adjustor for a feed dispenser is provided. The vernier adjustor includes first and second slotted members moveable in slidable relation and a pin, the first and second slotted members each including a plurality of slots separated by respective first and second spacings. The pin is adapted for placement within an aligned slot pairing to fix movement of the first slotted member relative to the second slotted member. The first and second slotted members are positionable in increments less than the first and second spacings. In particular, the first and second slotted members are positionable in increments substantially equal to the difference between the first spacing and the second spacing. Movement of the first slotted member relative to the second slotted member provides an incremental raising or lowering of a feed gate.

20 Claims, 5 Drawing Sheets

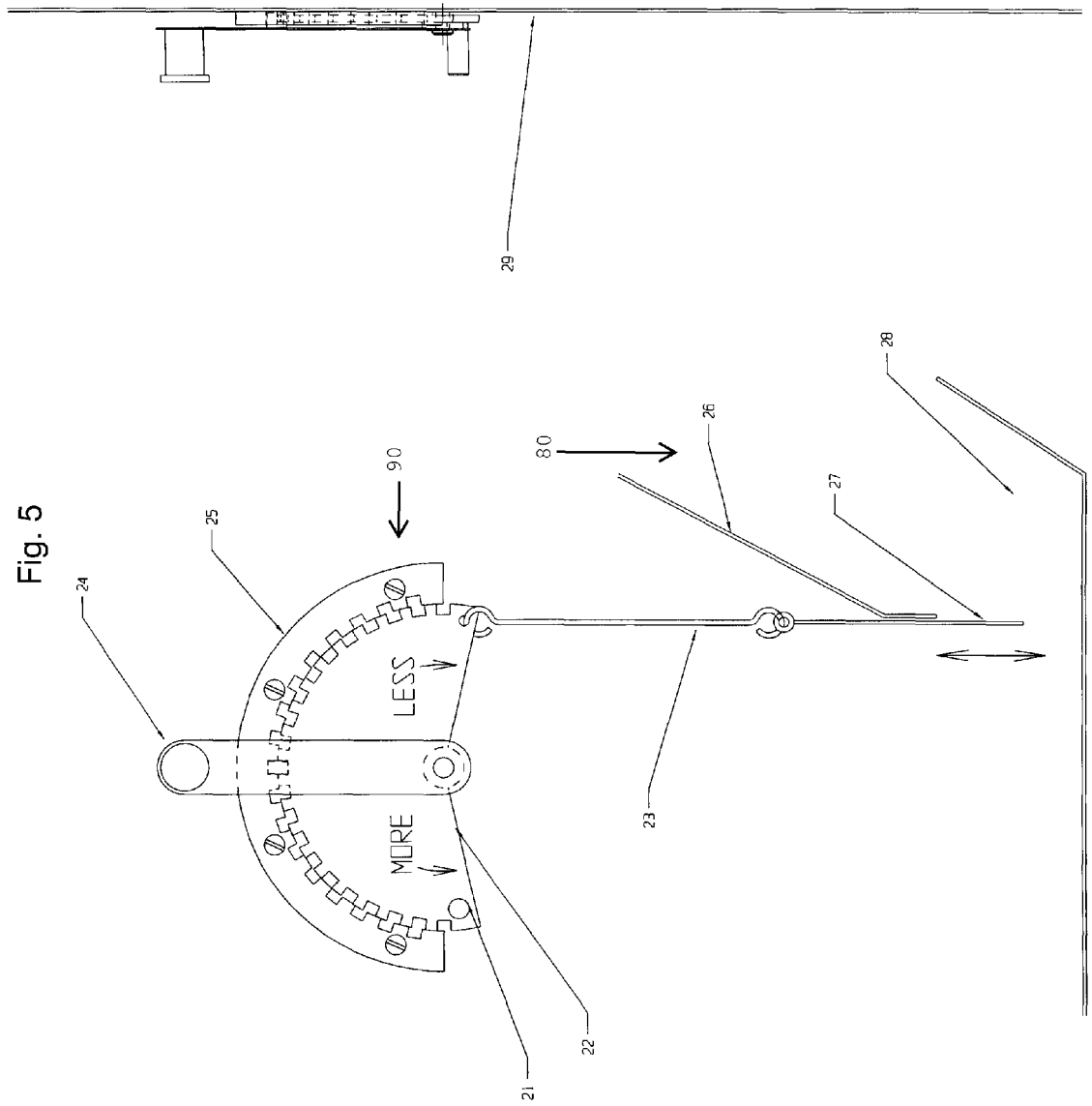

VERNIER ADJUSTOR FOR FEED DISPENSERS

BACKGROUND OF THE INVENTION

The present invention relates to vernier adjustors, and in particular to vernier adjustors for conveyor systems and other devices.

Conveyor systems are widely utilized in food and pharmaceutical processing, and typically include an endless belt trained around end rollers. The endless belt can lengthen over repeated uses, however, causing the belt to slip relative to one or both end rollers. Accordingly, belt tensioners are frequently used to take up slack in the endless belt. Take up can be accomplished by distancing the end rollers, or by adjusting the position of an idler pulley perpendicular to the path of travel of the endless belt.

Despite their widespread acceptance, known belt tensioners suffer from a number of shortcomings. For example, known belt tensioners can be difficult to clean, particularly as they accumulate particulate food and pharmaceutical products over time. These belt tensioners often include exposed threaded fasteners, blind holes, and gaps between metal surfaces that hide contaminants from view and that make cleaning the belt tensioner overly burdensome. In addition, known belt tensioners often provide adjustments in undesirably large increments, rendering the belt tensioners unsuitable for conveyor systems where precise tensioning of the endless belt is desired.

SUMMARY OF THE INVENTION

In one aspect of the invention, a vernier adjustor for a conveyor system is provided. The vernier adjustor includes first and second longitudinal members moveable in slidable relation, the first and second longitudinal members each including a plurality of slots separated by respective first and second spacings. The vernier adjustor further includes a pin for placement within an aligned slot pairing to position the first longitudinal member relative to the second longitudinal member. The first and second longitudinal members are positionable in increments less than the first and second spacings. In particular, the first and second longitudinal members are positionable in increments substantially equal to the difference between the first and second spacing.

In one embodiment, the first longitudinal member is fixed in relation to an end roller, and the second longitudinal member is fixed in relation to a conveyor sidewall. The first and second slotted members define centerline axes generally parallel to the conveyor system path of travel. In addition, the pin is pivotable about a pivot axis generally parallel to the centerline axes, and is slideably moveable along the pivot axis.

In another embodiment, the first and second plurality of slots open toward each other. The first longitudinal member defines a first number of slots greater than the number of slots defined in the second longitudinal member. The first spacing is optionally greater than the second spacing, while in other embodiments the first spacing is optionally less than the second spacing. In addition, the first longitudinal member is rigidly coupled to a bearing housing for supportably receiving an end roller shaft therein.

In another aspect of the invention, an adjustable feed dispenser is provided. The adjustable feed dispenser includes a feed hopper and a vernier adjustor. The feed hopper includes a vertically adjustable feed gate and a feed trough. The vernier adjustor incrementally raises and lowers the feed gate relative to the feed trough, and includes upper and lower slotted members and a pin. The upper slotted member includes a first plurality of slots separated by a first spacing, and the lower slotted member includes a second plurality of slots separated by a second spacing different from the first spacing. The lower slotted member is rotatable relative to the upper slotted member to align one of the first plurality of slots within one of the second plurality of slots. The pin is positionable within the aligned slots to set the desired height of the feed gate relative to the feed trough.

In one embodiment, the upper slotted member is arc-shaped and the lower slotted member is disk-shaped. The first plurality of slots are opposite the second plurality of slots, each extending along curved peripheries of the upper and lower slotted members, respectively. The vernier adjustor additionally includes a handle that is rotatable relative to both of the upper and lower slotted members. The pin is fixedly mounted to the handle, and the handle—and consequently the pin—is moveable axially relative to the upper and lower slotted members to engage and disengage the pin from between the upper and lower slotted members.

In another embodiment, the feed hopper includes a substantially vertical sidewall, the vernier adjustor being mounted to the substantially vertical sidewall. A lift rod coupled between the vernier adjustor and the feed gate converts rotary motion of the lower slotted member into a substantially vertical motion of the feed gate. The lower slotted member additionally includes a knob to assist a user in rotating the lower slotted member to a desired position relative to the upper slotted member. In use, the vernier adjustor, and consequently the feed gate, is adjustable in increments substantially equal to the difference between the first spacing and the second spacing.

The vernier adjustors of the present invention can therefore be utilized across a range of applications where incremental adjustment are desired. In addition, the vernier adjustors of the present invention can in some embodiments be adjusted or disassembled without the use of tools for cleaning and inspection, for example. These and other features and advantages of the present invention will become apparent from the following description of the invention, when viewed in accordance with the accompanying drawings and appended claims.

BRIEF DESCRIPTION OF THE DRAWINGS

FIG. 5 are elevation views of a vernier adjustor and feed dispenser in accordance with a second embodiment of the present invention.

DETAILED DESCRIPTION OF THE CURRENT EMBODIMENT

Figure 1:
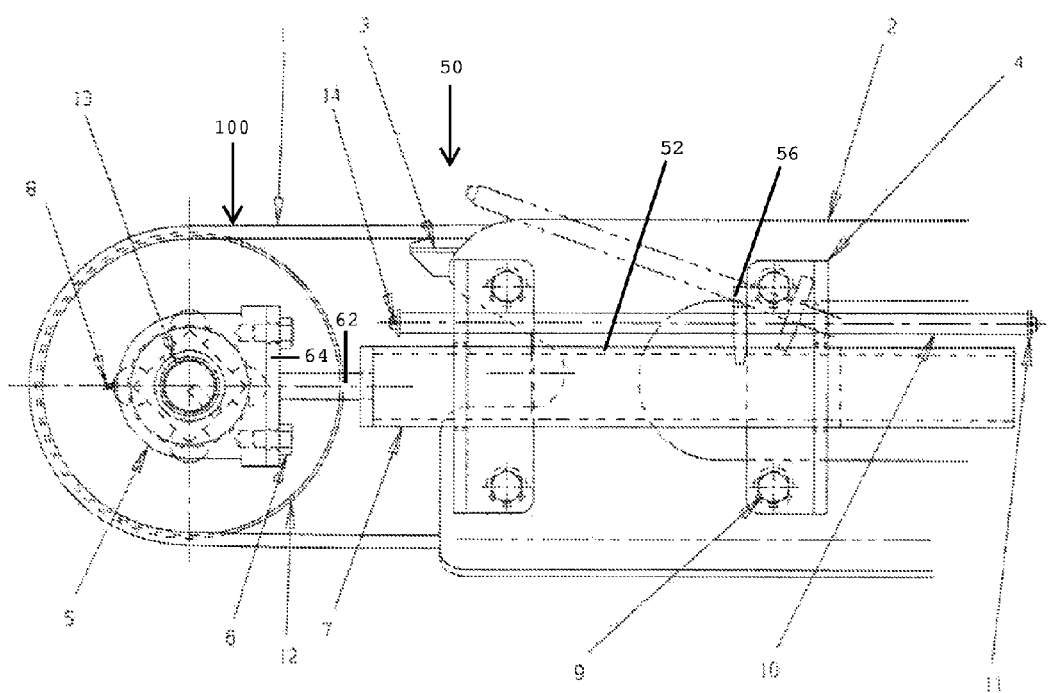
FIG. 1 is a side elevation view of a vernier adjustor and conveyor system in accordance with a first embodiment of the present invention.

In accordance with a first embodiment, a vernier adjustor for a conveyor system is illustrated in FIGS. 1-4. The vernier adjustor 50 generally includes an adjustable take-up weldment 52 having a first slot spacing, a fixed take-up weldment 54 having a second slot spacing different from the first slot spacing, and a pin 56 for restraining movement of the adjustable take-up weldment 52 relative to the fixed take-up weldment 54, where relative movement of the take-up weldments 52, 54 provides an incremental tensioning of a conveyor system.

Figure 2:
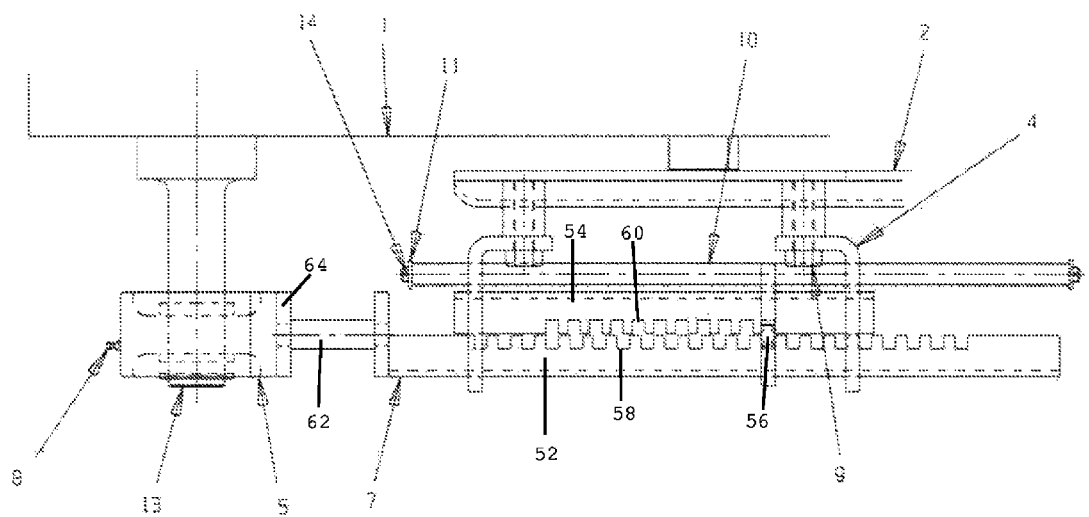
FIG. 2 is a top elevation view of the vernier adjustor and conveyor system of FIG. 1.
Figure 3:
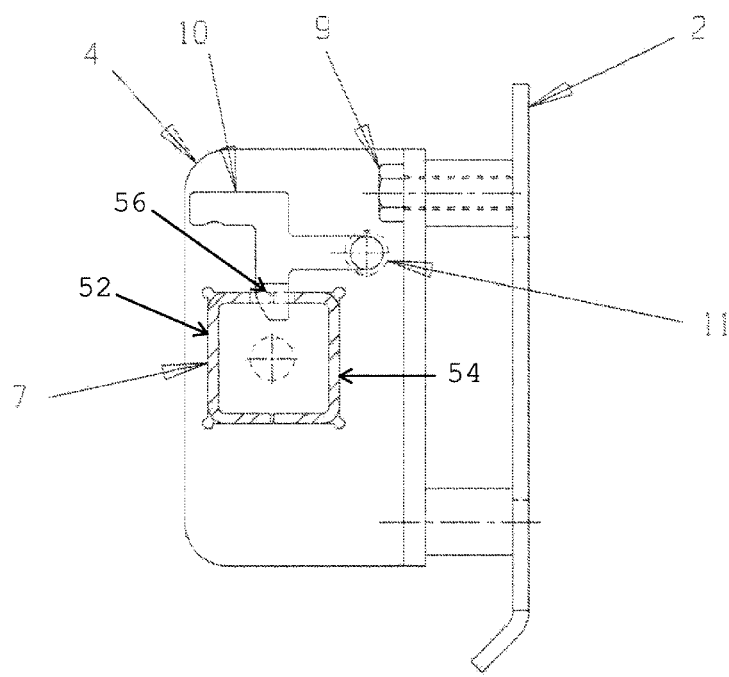
FIG. 3 is a first sectioned view of the vernier adjustor of FIG. 1.

A suitable conveyor system is illustrated in FIGS. 1-2 and generally designated 100. The conveyor system 100 generally includes an endless belt 1 trained about an end roller or tailstock pulley 12 for conveying articles along a path of travel. The tailstock pulley 12 is movable to load or unload the endless belt 1 in tension. For example, as the tailstock pulley 12 is moved leftward as viewed in FIGS. 1-2, the endless belt 1 is loaded in tension, and as the tailstock pulley 12 is moved rightward as viewed in FIGS. 1-2, the endless belt 1 is unloaded in tension. The adjustable take-up weldment 52 is fixed in relation to the tailstock pulley 12, and the fixed take-up weldment 54 is fixed in relation to another portion of the conveyor system 100, for example a conveyor frame weldment 2. As the vernier adjustor 50 lengthens, the endless belt 1 is loaded in tension, and conversely, as the vernier adjustor 50 shortens, the endless belt 1 is unloaded in tension.

As perhaps best shown in FIG. 2, each take-up weldment 52, 54 is generally elongate, and the adjustable take-up weldment 52 is free to move laterally along the fixed take-up weldment 54 when the pin 56 is refracted. The take-up weldments each include a plurality of slots 58, 60 defining a width w and separated by a corresponding spacing $S_1$, $S_2$. For example, each of the first plurality of slots 58 is separated by a first spacing $S_1$, and each of the second plurality of slots 60 is separated by a second spacing $S_2$, wherein $S_2$ is less than $S_1$ as shown in FIG. 2. The pin 56 includes a matching width w and is moveable laterally along a pivot arm 10 to allow placement within any aligned slot pairing, but not within a mis-aligned slot pairing. Optionally two or fewer slot pairings are aligned at any given time. Further optionally only one slot pairing is aligned at any given time. When the pin 56 is inserted in an aligned slot pairing, the adjustable take-up weldment 52 is fixed in relation to the fixed take-up weldment 54. Because the first spacing $S_1$ is different from the second spacing $S_2$, the take-up weldments 52, 54 are positionable in increments less than the first and second spacings $S_1$, $S_2$. In particular, the take-up weldments 52, 54 are positionable in increments substantially equal to the difference between the first spacing $S_1$ and the second spacing $S_2$, i.e., the incremental vernier adjustment distance $S_1-S_2$. In addition, each slot in the adjustable take-up weldment 52 can be paired with each slot in the fixed take-up weldment 54. In the illustrated embodiment, for example, two-hundred-and-thirty-one increments are possible, corresponding to the number of upper slots (eleven) multiplied by the number of lower slots (twenty-one).

As also shown in FIGS. 1-4, a tail stock pulley shaft 13 is supported at either end by a pillow block style bearing 5. The pillow block style bearing 5 is fastened to an extension rod 62 which is welded to the adjustable take-up weldment 52. A conveyor belt carrier strip 3 supports the endless belt 1 along the path of travel. Left and right mounting brackets 4 each include a first flange defining two holes for mounting to the conveyor frame weldment 2, and a second flange defining a single hole for the pin pivot arm 10 and a square-shaped channel for receipt of the take-up weldments 52, 54. The pivot arm 10 and pin 56 are removable as shown in phantom in FIG. 1 to facilitate cleaning and adjustment of the vernier adjustor 50. Bolts 6 mount the bearing housing 5 to the adjustable take-up weldment 52. The adjustable take-up weldment 52, which may be moved longitudinally in relation to the mating formed channel shown in FIGS. 3-4, includes a bearing plate 64, with holes used for mounting to the bearing housing 5, and a rod 62 used to connect to the bearing plate 64. And as noted above, the adjustable take-up weldment 52, 54 includes a plurality of rectangular notches being identical in shape and size and being spaced equally apart but being spaced differently than the notches in the fixed take up weldment 54, thereby creating a vernier device when used in combination with each other. The vernier adjustor 50 additionally includes a grease fitting 8, bolts for attaching the fixed take up weldment 9, and (as noted above) a pivot arm weldment 10. The pivot arm weldment 10 includes a pivot bar mounted in holes provided in the mounting brackets 4 to form a handle with which the pin 56 may be rotated, causing the pin (or engagement arm) 56 to enter the notches of both formed channels simultaneously and causing complete alignment between the notches via the engagement arm's angled sides. Washers 11 allow the pin 56 to slide to a pair of notches which are most closely in alignment but prevent any possible over travel of the pin 56. The washers 11 are optionally restrained in place by respective cotter pins 14.

Figure 4:
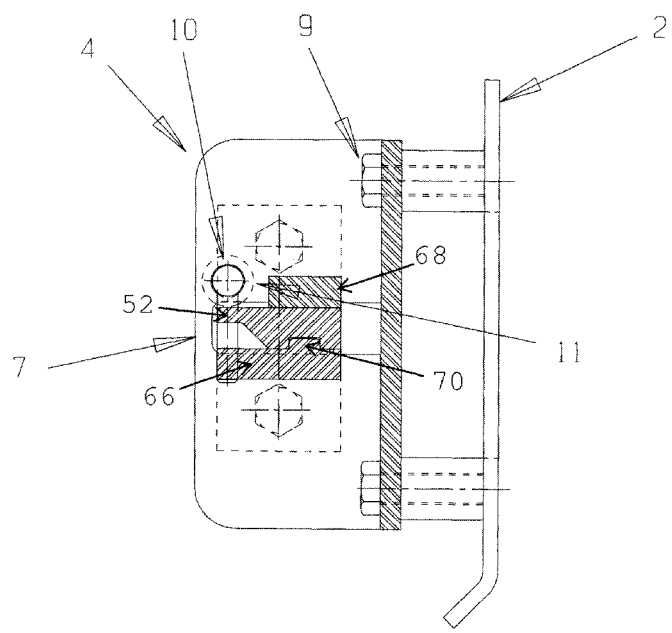
FIG. 4 is a second sectioned view of the vernier adjustor of FIG. 1.

As optionally shown in FIG. 4, the adjustable take-up weldment or "sliding plate" 52 is dimensionally restrained vertically by two parallel plates 66, 68 in order to be in alignment with the belt 1 of the conveyor in the direction of travel. For example, a lower plate 66 is machined to include a rectangular key 70, and the sliding plate 52 is machined to include a corresponding keyway. Hence, the upper and lower plates 66, 68 capture the sliding plate 52 between them, thereby holding the sliding plate 52 captive in the vertical direction. The key 70 in the lower plate is engaged with the keyway in the sliding plate 50 thereby holding the relationship horizontally and perpendicular to the direction of belt travel. As a result, the sliding plate 52 can only travel parallel to the direction of travel of the conveyor belt 1 and is limited in these two directions. As also shown in FIG. 4, the sliding plate 52 is machined along one edge, optionally the edge farthest from the conveyor frame 2 upon which the vernier adjustor 50 is mounted, and that machining consists of a plurality of slots of equal width and depth and are equally spaced as well. Further, of the above mentioned parallel plates 66, 68, the lower plate 66 is also machined along one edge, optionally that edge furthest away from the conveyor frame 2, and that machining consists of a plurality of slots of equal width and depth which match, including locking angle, the sliding plate geometry and are equally spaced, but said spacing is slightly larger or smaller than the spacing on the sliding plate 52, thereby, when considering the overall effect of such spacing along two adjacent edges, a vernier result is seen.

Referring again to FIG. 4, the two parallel plates 66, 68 are welded to a framework 4 which is mounted to the side frame of the conveyor 100 in close proximity to the tailstock-pulley 12. The result is that the stationary lower plate 66 remains stationary while the sliding parallel plate 52 is free to move to tighten the belt 1. By observing the alignment of the slots in the lower parallel plate 66 with those in the sliding plate 52, one can visually determine that one set of notches are very close to being in full alignment while all the other notches are more severely mismatched between the two notched plates 52, 66. The two notches in close alignment may be perfectly in alignment or may be mismatched, at a maximum, the distance between notches within the sliding plate 52 divided by the number of notches in the stationary plate 66. The number of notches in the stationary plate 66 is optionally ten or more, causing the maximum mismatch to be ten percent of the distance between notches. The sliding plate 52 optionally includes many more notches than the stationary plate 66, optionally at least three times more, given consideration to the maximum adjustment desired. Having selected the pair of slots that are most closely matched with appropriate tension on the belt, a blade 56 attached to the device frame can be slid to a position directly over the slots selected and then rotated into engagement with the two slots pulling them into full engagement. This blade 56 may be engaged or disengaged simply by finger pressure and is held in the engaged position by a locking angle machined into the engagement portion of the blade and all the notches would typically have a similar angle machined to match the blade when engaged.

The entirety of this vernier take up device 50 can be copied in an opposite hand form to mount on the opposite side of the conveyor frame and provide mounting for the opposite side of the tailstock pulley shaft 13. Having positioned both sides of the take up for tension, minor adjustments can be made to the device on either side of the conveyor frame to correct for tracking merely by moving the locating finger to the next adjacent pair of notches in either direction. Further optionally, the components providing support and guidance for the sliding plate are reversed from the above description. That is, the keyed component could be above the sliding plate rather than below it providing the sliding plate was correctly machined in order to achieve these positions. The rectangular notches can optionally be replaced with round holes with one set directly above or below the other set, one set being the stationary plate and the other being the sliding plate. Further, the holes can be tapered to a locking angle to accept a tapered pin used to engage the two plates in position. The conveyor is optionally of a catenary style, that is, a belt so loosely engaged within the conveyor that the belt on the return side of the conveyor sags intentionally. This take up device can accommodate this style of belting simply by not adjusting for full belt tension. The features and components of the device can be manufactured using formed sheet metal as the base material and the various features may be formed, extruded, or otherwise manufactured to achieve the desired functions of the device. The key and keyway features are optionally replaced with side guides to the sliding plate providing the necessary sliding action described. The device can optionally be used primarily for its simplicity of use without respect for any cleaning features, without respect for use without adjusting tools, and as a replacement for any conventional take up devices. The present embodiment therefore provides a simple, effective take up device that is particularly well suited for use in material handling applications wherein achieving cleanliness and protecting consumable products being conveyed is considered important.

It should be noted that the vernier adjustment feature is independent of: (a) the geometry used, in that the notches provided for final positioning may be square, round, star shaped or any other shaped recess or through-hole; (b) the number of increments used, in that any number may be used and the use of ten increments is for example only; (c) the sequence of location, in that the notches, if used in a base ten situation, need not be sequential in that each successive notch be different by a ten percent margin from adjacent notches. In addition, the mix could be entirely variable such as ten percent variance to the second notch, forty percent variance between the second notch to the third notch, twenty percent variance between the third notch to the fourth notch, etc. The formed channels can also be bar stock or be welded and the described notches can include holes, or half holes, etc., including a vernier scale with the ability to pin the sliding member to the fixed member.

In accordance with a second embodiment, an adjustable feed dispenser is illustrated in FIG. 5. The adjustable feed dispenser includes a feed hopper 80 and a vernier adjustor 90. The feed hopper 80 includes a vertically adjustable feed gate 27 and a feed trough 28. The vernier adjustor 90 is structurally and functionally similar to the vernier adjustor of FIGS. 1-4, and includes an adjustable lower member 22 that rotates with respect to a stationary upper member 25. Rotation of the adjustable lower member 22 relative to the stationary upper member 25 incrementally raises and lowers the feed gate 27 relative to the feed trough 29.

Referring now to FIG. 5, the stationary upper member 25 includes half-holes of equal size that are spaced along the perimeter of its inside radius. The rotatable lower member 22 includes half-holes equal in size to those in the upper member 25, but being spaced at a smaller (or larger) distance than the half-holes in the upper member 25. The rotatable lower member 22 is optionally engraved with arrows and text indicating "MORE" and "LESS" as shown in FIG. 5. In use, the user grasps a finger handle 21 to rotate the lower member 22 about a common pivot point 92 while also pulling the spring steel arm of the handle 24 to disengage a vernier engagement pin 94. When the lift gate 27 and feeder frame 26 is adjusted to the user's satisfaction (the lift gate being used to release grain or other feed into the trough), the user rotates the handle 24 to the pair of holes most nearly matching each other in position, and allows the spring action to bias the pin 94 with the aligned hole pairing. The lower disk 22 additionally includes a lift rod 23 attached to it and one end, the lift rod 23 being attached to the lift gate 27 and the other end. The device 90 thereby causes a closely adjusted amount of feed to enter the trough 28. In addition, the feed hopper 80 is shown as including a vertical sidewall 29, the vernier adjustor 90 being mounted to the vertical sidewall 29.

Though the above embodiments are described as pertaining to conveyor systems and feed dispensers, the vernier adjustor of the present invention is not limited to these applications, and can instead be used across a range of applications where an incremental adjustment is desired, including for example Bowden cables and orthopedic applications. A suitable vernier adjustor can include for example a first slotted member including a first plurality of slots separated by a first spacing, a second slotted member including a second plurality of slots separated by a second spacing different from the first spacing, and a pin for placement within an aligned slot pairing, where the first and second slotted members are moveable (e.g., slidable and/or rotatable) with respect to one another. The first and second slotted members can be anchored to respective first and second portions of a device, feature or component, wherein incremental adjustment of the vernier adjustor results in the linear and/or angular displacement of the first portion relative to the second portion. Depending on the application, the first and second slotted members can be plates, disks, bands, beams or any other two- or three-dimensional structure including a plurality of slots. In addition, the pin can be removably or non-removably attached to the vernier adjustor, and can define a width substantially equal to the width of each plurality of slots as generally set forth above.

The above description is that of current embodiments. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the," or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. An adjustable feed dispenser comprising:
    a feed hopper including a vertically adjustable feed gate and a feed trough; and
    a vernier adjustor to selectively raise or lower the feed gate relative to the feed trough, the vernier adjustor including:
        an upper slotted member including a first plurality of slots separated by a first spacing;
        a lower slotted member including a second plurality of slots separated by a second spacing different from the first spacing, wherein the lower slotted member is rotatable relative to the upper slotted member to align one of the first plurality of slots with one of the second plurality of slots; and
        a pin positionable within the aligned slots, wherein the lower slotted member is operatively coupled to the feed gate and rotation of the lower slotted member selectively raises or lowers the feed gate relative to the feed trough.

2. The adjustable feed dispenser of claim 1 wherein the upper slotted member includes a radially inward periphery, the first plurality of slots being uniformly disposed about the radially inward periphery.

3. The adjustable feed dispenser of claim 1 wherein the lower slotted member is disk shaped and includes a radially outward periphery, the second plurality of slots being uniformly disposed about the radially outward periphery.

4. The adjustable feed dispenser of claim 1 further including a movable handle coaxially rotatable with respect to the lower slotted member, wherein the pin is fixedly mounted to the movable handle.

5. The adjustable feed dispenser of claim 1 wherein the feed hopper includes a vertical sidewall, the vernier adjustor being mounted to the vertical sidewall.

6. The adjustable feed dispenser of claim 1 further including a lift rod coupled between the lower slotted member and the feed gate to convert a rotary motion of the lower slotted member into a substantially vertical motion of the feed gate.

7. A vernier adjustor for a feed dispenser including a feed gate and a feed trough, the vernier adjustor comprising:
    an upper slotted member including a first plurality of slots separated by a first spacing;
    a lower slotted member including a second plurality of slots separated by a second spacing different from the first spacing, wherein the upper and lower slotted members are rotatable relative to each other to align one of the first plurality of slots with one of the second plurality of slots; and
    a pin positionable within the aligned slots, wherein one of the upper and lower slotted members is operatively coupled to the feed gate to selectively raise or lower the feed gate relative to the feed trough.

8. The vernier adjustor of claim 7 wherein the lower slotted member is rotatable about a pivot point and wherein the upper slotted member is stationary.

9. The vernier adjustor of claim 8 wherein the lower slotted member includes a finger handle to rotate the lower slotted member relative to the upper slotted member.

10. The vernier adjustor of claim 8 further including a lift rod coupled between the lower slotted member and the feed gate to convert a rotary motion of the lower slotted member into a substantially vertical motion of the feed gate.

11. The vernier adjustor of claim 7 wherein the upper slotted member includes a radially inward periphery, the first plurality of slots being uniformly disposed about the radially inward periphery.

12. The vernier adjustor of claim 11 wherein the first plurality of slots extend along a substantially portion of the radially inward periphery of the upper slotted member.

13. The vernier adjustor of claim 7 wherein the lower slotted member is disk shaped and includes a radially outward periphery, the second plurality of slots being uniformly disposed about the radially outward periphery.

14. The vernier adjustor of claim 13 wherein the second plurality of slots extend along a substantially portion of the radially outward periphery of the lower slotted member.

15. The vernier adjustor of claim 7 further including a movable handle coaxially rotatable with respect to the lower slotted member, wherein the pin is fixedly mounted to the movable handle.

16. The vernier adjustor of claim 15 wherein the pin is spring biased into an aligned pair of the first and second plurality of slots.

17. The vernier adjustor of claim 7 wherein the first spacing for the upper slotted member is larger than the second spacing for the lower slotted member.

18. The vernier adjustor of claim 7 wherein the first spacing for the upper slotted member is smaller than the second spacing for the lower slotted member.

19. The vernier adjustor of claim 7 wherein the difference between the first and second spacings provide an incremental adjustment of the vernier adjustor.

20. The vernier adjustor of claim 7 wherein the first plurality of slots includes a first number of slots less than the number of slots in the second plurality of slots.

* * * * *